(12) United States Patent
Hishinuma

(10) Patent No.: US 6,197,136 B1
(45) Date of Patent: Mar. 6, 2001

(54) METHOD OF SETTING HEAT-SEALING CONDITIONS

(76) Inventor: Kazuo Hishinuma, 1232, Ogura, Saiwai-ku, Kawasaki-shi, Kanagawa (JP)

( * ) Notice: Subject to any disclaimer, the term of this patent is extended or adjusted under 35 U.S.C. 154(b) by 0 days.

(21) Appl. No.: 09/268,577

(22) Filed: Mar. 15, 1999

(30) Foreign Application Priority Data

Sep. 21, 1998 (JP) .................................................. 10-303129
Sep. 21, 1998 (JP) .................................................. 10-303130

(51) Int. Cl.$^7$ ...................................................... B32B 31/20
(52) U.S. Cl. .............................................. 156/64; 156/228
(58) Field of Search ........................... 156/359, 64, 228, 156/308.4, 583.1, 308.2; 702/99

(56) References Cited

U.S. PATENT DOCUMENTS 4,346,196 * 8/1982 Hoh et al. ............................ 525/196
5,616,199 * 4/1997 Jurrius et al. .......................... 156/64

\* cited by examiner

*Primary Examiner*—Richard Crispino
*Assistant Examiner*—George R. Koch, III

(74) *Attorney, Agent, or Firm*—Flynn, Thiel, Boutell & Tanis, P.C.

(57) ABSTRACT

A simple method of setting heat-sealing conditions which involves the steps of, (1) using a pressing with heating apparatus having two faces which face each other, at least one face thereof being movable toward the other face to nip an object to be heat-sealed, at least one face being provided with a heating means, and at least a temperature of one face being measurable, (2) providing a surface cover material to a heating face which is the same material as a surface cover material of a real heat sealer to be used, (3) inserting a minute temperature sensor between heat-sealing surfaces of the object to be heat-sealed, (4) locating the object between the two faces, (5) heating the face provided with a heating means at a temperature exceeding the fusing point of the surface to be heat-sealed of the object, (6) moving the movable face toward the other face to nip the object, (7) measuring a time course of temperature at a part to be heat-sealed of the object, (8) setting a pressing period of the real heat sealer as the time course of temperature being the same as the time course of the above step (7) at the temperature of the step (5).

6 Claims, 4 Drawing Sheets

METHOD OF SETTING HEAT-SEALING CONDITIONS

BACKGROUND OF THE INVENTION

This invention relates to a method of setting heat-sealing conditions of a thermoplastic sheet.

Heat-sealing is now widely utilized for sealing the opening of containers, making bags, and so on. The degree of heat seal ranges from separable bonding to complete sealing so as not to pass vapors and microorganisms. There are various factors which influence heat-sealing, such as material to be heat-sealed, designed heat seal strength, the type and seal of a heat sealer, line speed, and ambient temperature. However, when these factors are fixed, i.e. when heat-sealing is is conducted as to a predetermined sheet in a predetermined factory, the heat-sealing conditions depend on heat-sealing temperature and pressing period.

Heretofore, the heat-sealing temperature and pressing period were set empirically by repeating trial and error using a real machine. That is, by using a lot of real material with labor, a heat-sealing test was repeated with the varying of the heat-sealing temperature and pressing period in a wide range, and the heat sealed samples thus obtained were evaluated by JIS method(s), specially tensile strength (JIS Z 0238) and visual inspection. Through the test period, industrial production must be stopped, and nevertheless, the heat sealing conditions thus designed were not so accurate. As a result, the heat-sealing conditions were set slightly higher which tend to induce thermal damages at the heat sealed part.

SUMMARY OF THE INVENTION

An object of the invention is to provide a method of setting heat-sealing conditions easily and accurately by a compact tester using only a small amount of real material and without stopping of industrial production.

In order to achieve the above object, the inventor investigated earnestly, and devised a compact heat-sealing tester having a pair of heating blocks which controls its surface temperature with high accuracy and nips to heat-seal an object and a temperature microsensor which is inserted between heat-sealing surfaces of the object. He further investigated, and found that, by attaching a surface cover material to the heating face which is the same as the surface cover material of a real heat sealer, substantially the same heat-sealing conditions as the real heat sealer can be allowed to occur, and by tracing the temperature at just the part to be heat-sealed, the heat-sealing conditions of the real heat sealer can be seen. The inventor further found that, the above technique can be generalized and applicable to other type heat sealers, e.g. one heater type, simulation of double step heat sealing, etc.

The present invention has been achieved based on the above findings, and provides:

A method of setting heat-sealing conditions which comprises.
  (1) using a pressing and heating apparatus having two faces which face each other, at least one face thereof being movable toward the other face to nip an object to be heat-sealed, at least one face being provided with a heating means, and at least a temperature of one face being measured,
  (2) providing a surface cover material to a heating face which is the same material as a surface cover material of a real heat sealer to be used,
  (3) inserting a minute temperature sensor between heat-sealing surfaces of the object to be heat-sealed,
  (4) locating the object between the two faces,
  (5) heating the face provided with a heating means at a temperature exceeding the fusing point of the surface to be heat-sealed of the object,
  (6) moving the movable face toward the other face to nip the object,
  (7) measuring a time course of temperature at a part to be heat-sealed of the object, and,
  (8) setting a pressing period of the real heat sealer as the time course of temperature being the same as the time course of the above step (7) at the temperature of the step (5).

In heat-sealing, an important factor is the initiation of fusion at the par-t to be heat-sealed, i.e. the surfaces to be heat-sealed. Using the above device, the inventor devised a simple and accurate method for determining the initiation of fusion at the part to be heat-sealed, which comprises differentiating the time course obtained in the step (7) twice, and the fusing point is at the position where the difference value changes from minus to plus.

Figure 1:
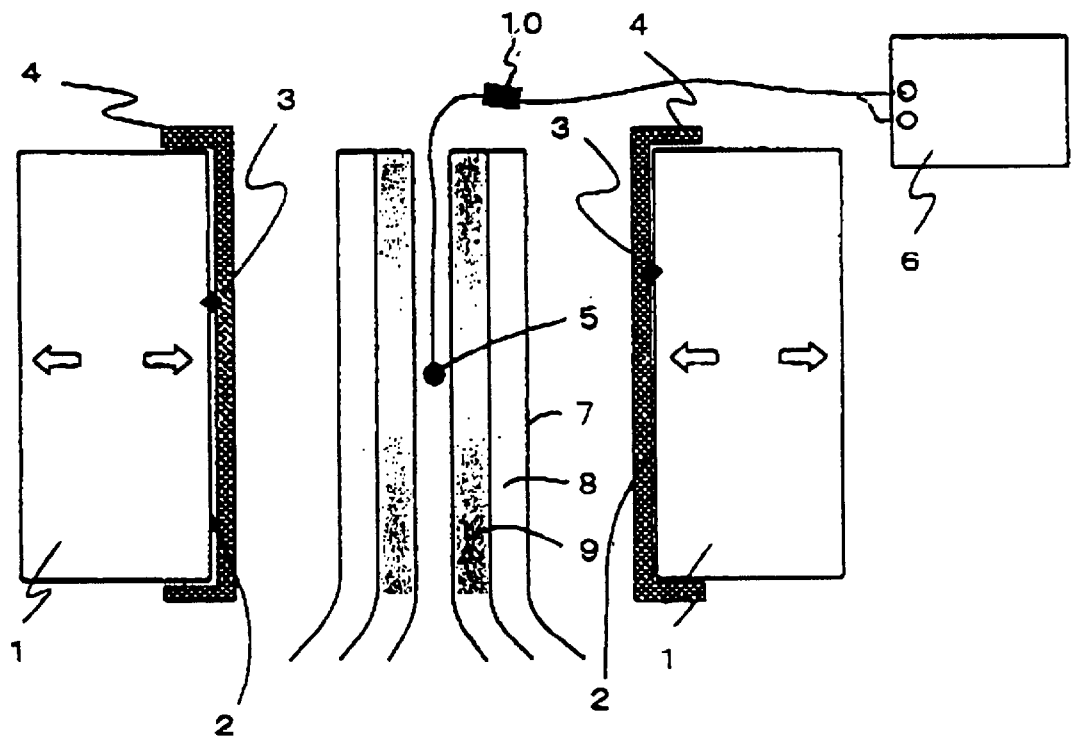
FIG. 1 is a schematic view illustrating an embodiment of the invention.

1 . . . Heating block
2 . . . Heating face
3 . . . Temperature sensor
4 . . . Surface cover material
5 . . . Minute temperature sensor
6 . . . Recorder
7 . . . Object to be heat-sealed
8 . . . Substrate layer
9 . . . Heat-sealing layer
10 . . . Connector

DETAILED DESCRIPTION OF THE INVENTION

The pressing and heating apparatus used in the method of the invention corresponds to the compact heat-sealing tester, and has two faces forming a nip to heat-seal a object to be heat-sealed. Necessary conditions which must meet the real heat sealer to be used are the surface temperature of both faces, heat conductivity and thickness of the surface layer material of both faces and the object to be heat-sealed. That is, the shape and area of both faces may be not conform to the real heat sealer. In general, both faces are flat and rectangular, and have a width of about 10 to 30 mm, preferably about 15 to 25 mm and a length of about 50 to 100 mm, preferably 60 to 80 mm. The material of both faces can be selected from those used in commercial heat sealers, such as stainless steel, brass or aluminum.

In order to nip the object, either one face moves or both faces move. The inventor found that heat-sealed state depends on mainly the heating temperature and period, and nipping pressure does not greatly influence the heat-sealed state. That is, the nipping pressure of both faces is not so important, and in general, it is enough to nip the object to be heat-sealed so as to contact both heat-sealing surfaces. A conventional nip pressure is in the range of about 0.5 to 2 kg/cm², and it is preferable to adjust the nip pressure to the real heat sealer. The surface temperature of both faces must meet the real heat sealer. That is, when both faces of the real heat sealer are provided with a heating means, both faces of the pressing and heating apparatus must be provided with a heating means. On the other hand, when only one face of the real heat sealer is provided with a heating means, the heating means of one face of the pressing and heating apparatus is allowed to work. When the set temperature of the real heat sealer is different between the faces nipping the object to be heat-sealed, each pressing face of the heating apparatus is also adjusted to the temperature of the real heat sealer. The temperature control ability of the heating means of the pressing and heating apparatus must be exact and can be adjusted in the range of about ±5° C., preferably about ±3° C., more preferably ±2° C. of the set surface temperature. A convenient heating means is an electric heater, a heater utilizing radiation heat, high frequency electric heating, and any other heating means is applicable. The temperature controller may be a commercial one.

The surface temperature of the face which is heated must be measured. Since the face is covered with a surface cover material, a thermometer is set on the face or embedded near the face. Preferable thermometers are the type which transmit electric signals, such as a temperature sensor.

The surface cover material provided on the heating face is the same material, particularly having the same heat conductivity and thickness as the surface cover material of the real heat sealer, and it is convenient to use a piece of the same sheet as the real heat sealer. The surface cover material is used for rendering the heating face non-adherent upon detaching the heating face from the object to be heat-sealed. A representative surface cover material is a fluororesin, such as polytetrafluoroethylene (Teflon), sheet having a thickness of about 0.1 to 0.3 mm.

A minute temperature sensor is inserted between the heat-sealing surfaces of the object to be heat-sealed. When the heat capacity of the minute temperature sensor is large, the detection of fusion becomes vague. Furthermore, the thickness of the minute temperature sensor must be very thin so as not to influence the heat-sealing. The body of the sensor is, in general, a wire, and a suitable diameter is smaller than 200 $\mu$m, preferably smaller than 100 $\mu$m, more preferably smaller than 50 $\mu$m, particularly preferably smaller than 40 $\mu$m. The smaller limit depends on the practical view point, and is 5 $\mu$m or more, preferably 10 $\mu$m or more. Moreover, the minute temperature sensor has heat resistance capable of resisting heat-sealing temperature, usually up to about 300° C. The type of the temperature sensor is a thermocouple, thermistor or the like. A suitable temperature sensor is available from RKC INSTRUMENT INC. Japan.

The object to be heat-sealed is a real material, and is usually a pair of sheets. The type of sheet is selected by the intended use and the like, and may be a single layer sheet or a multilayer sheet. The thickness of the sheet ranges from about 10 $\mu$m to 2 mm, usually about from about 20 $\mu$m to 200 $\mu$m. The method of the invention is also applicable to other embodiments, such as heat-sealing an opening of a container.

In the method of setting heat-sealing conditions of the invention, the heating conditions are arranged so as to meet the real heat sealer. That is, usually, since the real heat sealer has been heated to a set temperature, the heating face of the pressing and heating apparatus is also heated to each temperature prior to nipping. Then, the object to be heat-sealed containing a minute temperature sensor between heat-sealing surfaces thereof is interposed between the two faces, and nipped by them. The time course of the temperature is measured at the part to be heat-sealed, i.e., heat-sealing surfaces contracting with each other.

After the measurement, the minute temperature sensor can be taken out by heating to melt the heat-sealed object, or is thrown away.

When the temperature of the real heat sealer is previously set, it is enough that the method of the invention is carried out at the temperature. However, in general, since there is a possibility of varying the heating temperature, it is convenient that data have been obtained at various temperatures. In any event, since heat sealing occurs at the melting point of tier heat sealing surface, the temperatures vary in the range from about the melting point to higher than that, preferably at intervals of about 10° C., more preferably about 5° C.

Figure 5:
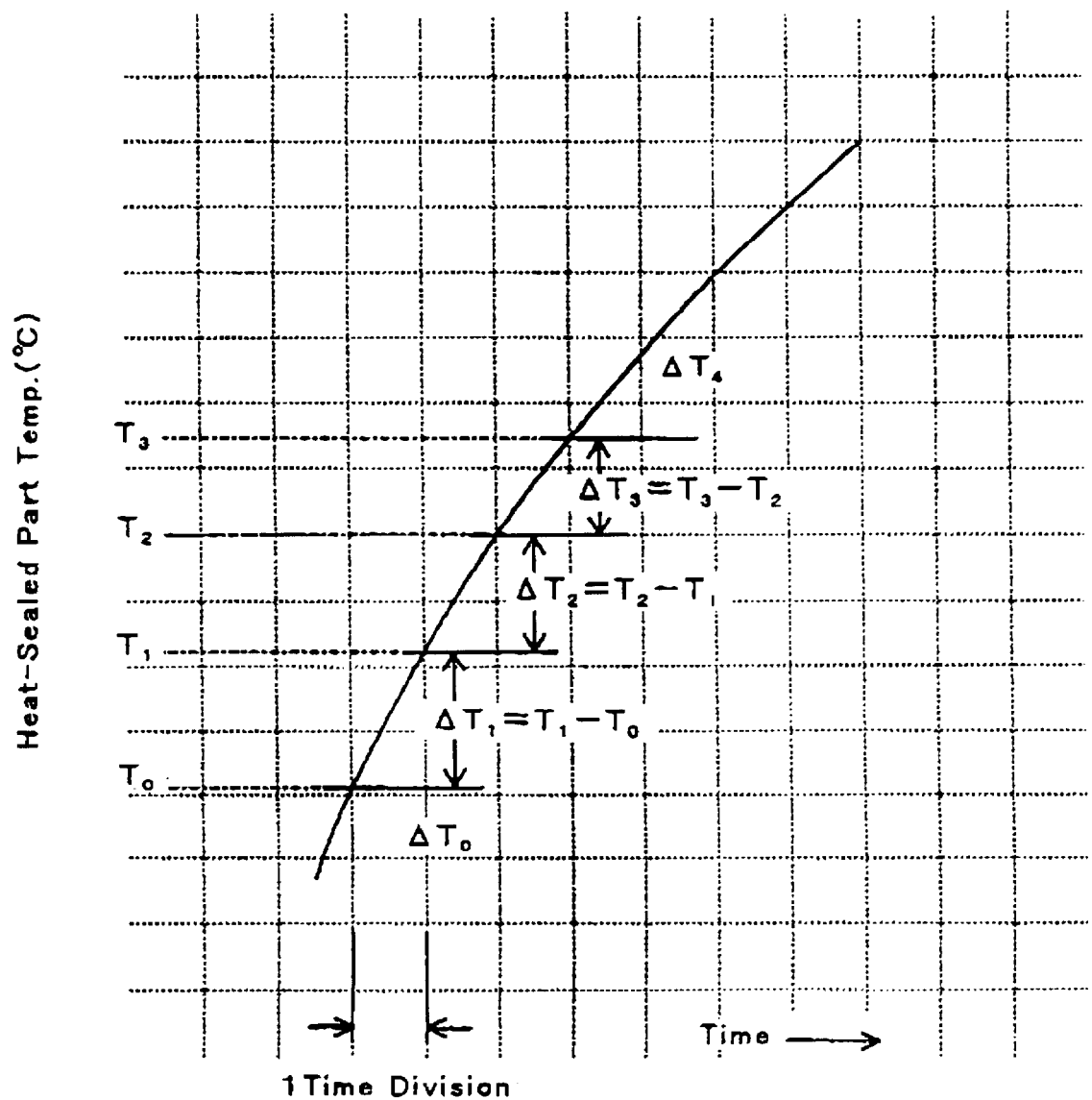
FIG. 5 is a graph for the explanation of approximate differentiationa.

In heat-sealing processes, it is important to know the fusing point of the heat-sealing surface, and the fusing point can be easily found by using the pressing and heating apparatus. That is, there is an inflection point in the curve of each time course of the temperature at the part to be heat-sealed, and the temperature at the inflection point is the fusing point. The inflection is very small, and therefore, the inflection point cannot easily be found. However, by conducting approximate primary differentiation of the curve, the difference value becomes minimum at the inflection point. The inflection point can be further made clear by conducting approximate secondary differentiation where the inflection point appears a great turning point of the difference value from minus to plus. As an actual manner, it is preferable to adjust the heating rate from the heating face(s) to the object to be heat-sealed to, 0.5 to 5° C./time division by arranging the heating control material interposed between the heating face and the object to be heat-sealed, i.e. the surface cover material. The temperature curve with time at the part to be heat-sealed is divided into regular time intervals, i.e. time divisions, preferably intervals of about 0.1 to 1 second. The temperature elevation rate is calculated as to each time division, and the approximate primary differentiation is carried out, as follows: In FIG. 5, an example of the temperature elevation with time is illustrated. In the figure, temperature is elevated by $\Delta T_1, \Delta T_2, \ldots, \Delta T_n, \ldots$ at each time division. The primary differential values are $\Delta T_1, \Delta T_2, \ldots, \Delta T_n, \ldots$. The primary differential values are further differentiated by the approximate differentiation, that is, in FIG. 5, $\Delta T_1 - \Delta T_0 = \Delta^2 T_1$, $\Delta T_2 - \Delta T_1 = \Delta^2 T_2$, $\ldots \Delta T_n - \Delta T_{n-1} = \Delta^2 T_n$, are calculated, to replace the temperature variation at the part to be heat-sealed by plus or minus values. The secondary differential values are $\Delta^2 T_1, \Delta^2 T_2, \ldots$. Actually, the measured data are converted to digital signals, and the above differentiation are carried out by a computer. In the approximate secondary differentiation, there is a point greatly changed to a plus value, and the point is provisionally set as the fusing point. By conducting the approximate secondary differentiation, the influence caused by the scattering of the heating temperature gradient can be minimized. Then, the above test is repeated in the range about the provisional fusing point±1 to 5° C. to determine the fusing point.

For the purpose of measuring the fusing point, the heating control material may be not the surface material of the real heat sealer.

Using the relation between temperature and time thus obtained, the heat-sealing temperature and pressing period of the real heat sealer is set so as to obtain a designed heat seal state, especially tensile strength. For that purpose, it is preferable that the relation between the heat-sealing temperature and pressing period and tensile strength at the heat-sealed part has been measured. However, the desired heat seal state is, in general, not so varied, and the time can be set to exceed the fusing point by 3° C. or mole, preferably 5° C. or more, particularly preferably 10° C. or more and 60° C. or less, preferable 30° C. or less, particularly preferably 20° C. or less at the part to be heat-sealed, as the pressing period at each heating face temperature.

By utilizing the setting method of the invention, a suitable heat-sealing condition of a real machine can be set easily, rapidly, surely and cheaply without the stopping of factory production and waste of real material. The method can be applied to universal quality control for heat-sealing, and to giving full play to "CCP" of "HACCP" for heat-sealing processes.

EXAMPLES

Example 1

Figure 2:
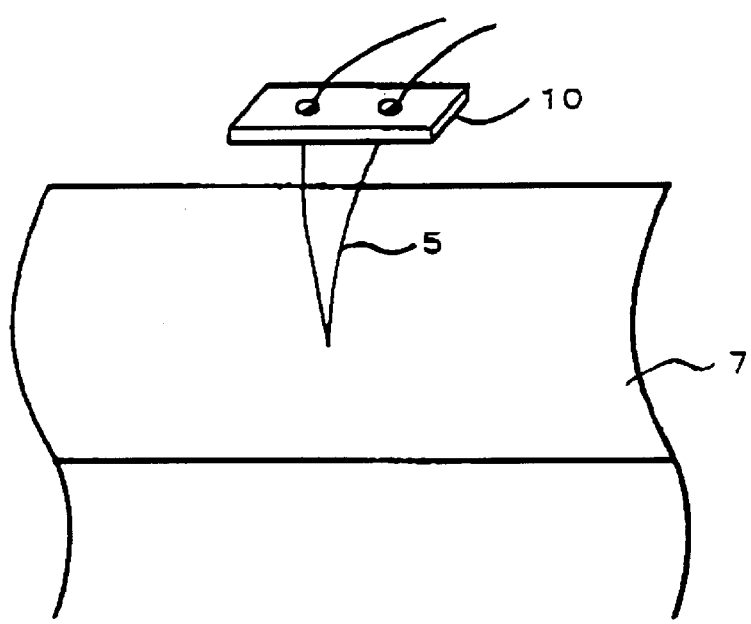
FIG. 2 is a front view of an object in a state of measuring time course of temperature.

A pressing and heating apparatus as shown in FIGS. 1, 2 was used.

The pressing and heating apparatus is composed of two movable heating blocks 1 each having a heating face 2 of 2 cm width×8 cm length. The surface temperature of each heating face 2 can be measured by the minute temperature sensor 3 attached to each face 2. As the surface cover material 4, one Teflon sheet 0.2 mm in thickness used in a real heat sealer was attached to each face 2. The minute temperature sensor 5 was a wire of thermocouple "CA Thermocouple ST-50" (RKC INSTRUMENT INC. diameter: 50 $\mu$m$\phi$) and a custom-made thermocouple (diameter: 25 $\mu$m $\phi$) manufactured by the same company, and connected to a recorder 6 through a connector 10.

The object to be heat-sealed 7 was a double layer sheet having a size of 1.5×5.0 cm consisting of a substrate layer 8 composed of nylon 25 $\mu$m in thickness and a heat-sealing layer 9 composed of polyethylene (L-LDPE) 50 $\mu$m in thickness. The fusing point of the heat-sealing layer 9 was 120° C.

The temperature of the heating face 2 was set at 130° C., 143° C., 150° C. and 160° C., respectively, and the time course of temperature was measured by the minute temperature sensor 5.

Figure 3:
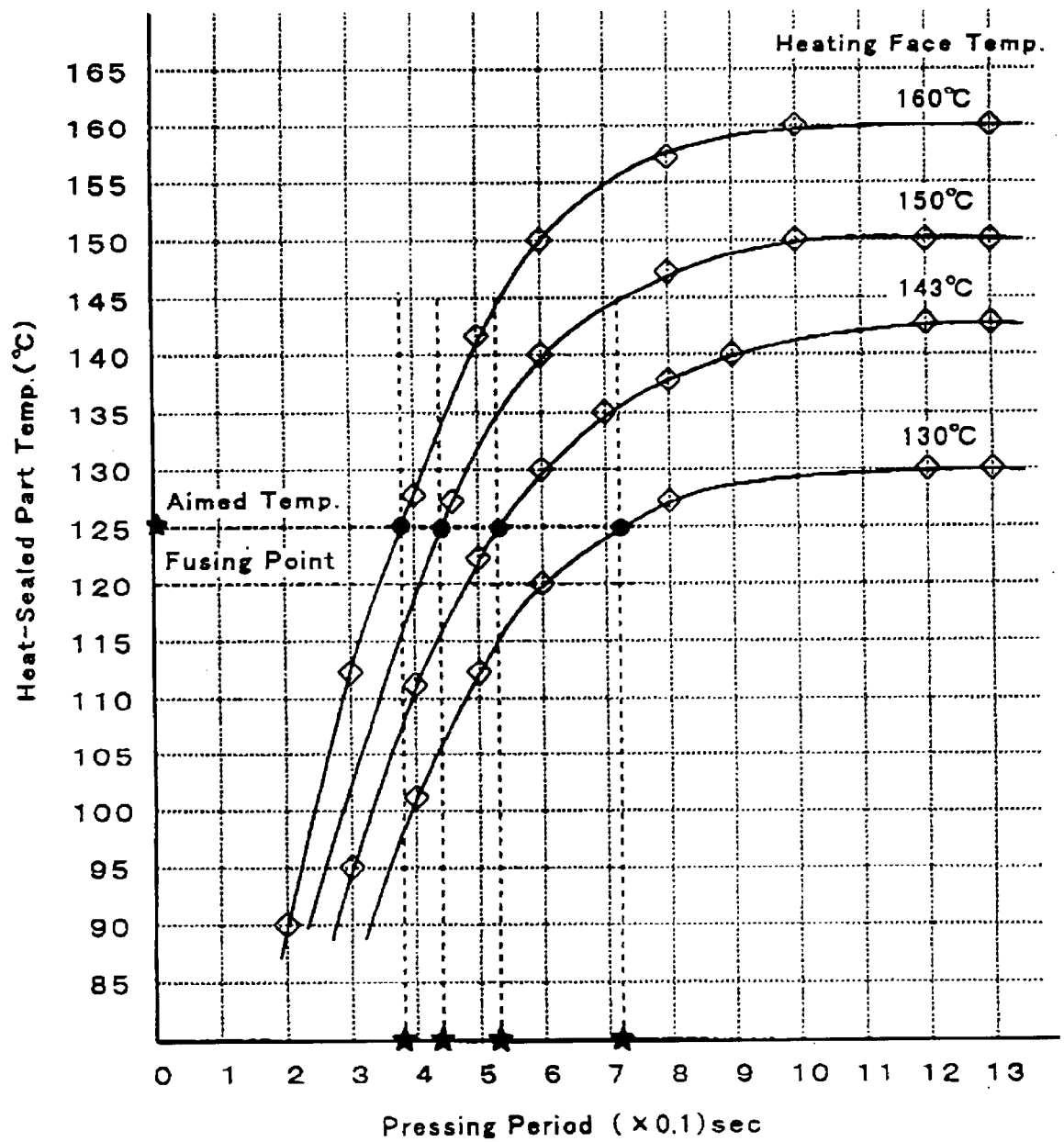
FIG. 3 is a graph indicating the relation between pressing period and temperature at a part to be heat-sealed while varying the surface temperature of both faces provided with a heating means at the same temperature respectively.

The results are shown in FIG. 3. The desired temperature was previously set at 125° C. As can be seen from the Figure, when the temperature of the heating face is 160° C., a suitable pressing period is 0.38 second. Similarly, a suitable pressing period is 0.43 second at a heating face temperature of 150° C., 0.53 second at a heating face temperature of 143° C., and 0.71 second at a heating face temperature of 130° C., respectively. Hereupon, the pressing period is not the press working time but the contacting period of the heating face, such as a heating bar of a real heat sealer.

Subsequently, the fusing point of the heat-sealing layer was measured. The temperature of the heating face was adjusted to about 160° C., and the time course of the temperature was measured and shown in FIG. 4(a) by a full line. The narrow line slightly higher than that is a time course of temperature in the case of no thermal change. The left encircled part indicates the softening initiation zone, and the right encircled part indicates the fusing initiation zone. The time course was divided into 0.2 second periods, and the approximate primary differentiation and the approximate secondary differentiation were carried out.

Figure 4:
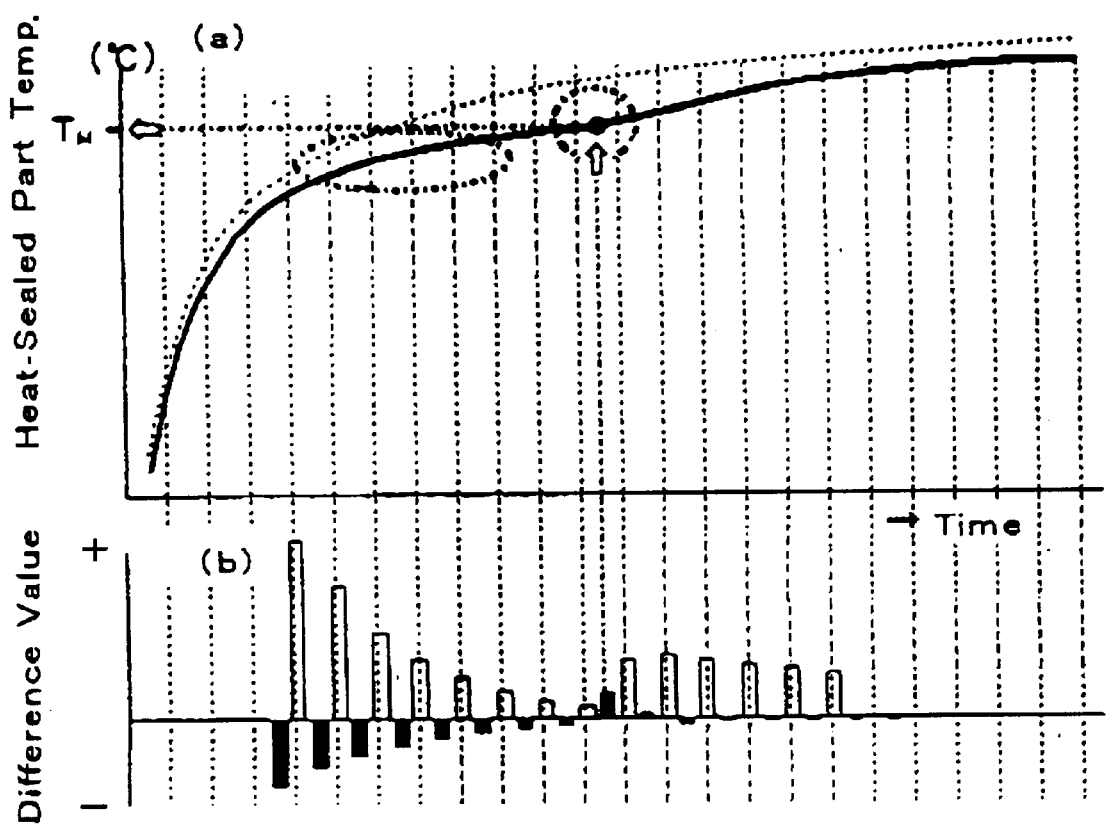
FIG. 4 is a graph indicating the relation between pressing period and temperature at da part to be heat-sealed, and the results of differentiation.

The results are shown in FIG. 4(b). White bars indicate the results of the approximate primary differentiation, and black bars indicate the results of the approximate secondary differentiation. From the results of the approximate secondary differentiation, it can be seen that the rate of heat transfer greatly increases at the inflection point (Tm). The inflection point thus obtained was 120° C., which is approximately equal to the fusing point of the heat-sealing layer.

The above heat-sealing conditions, i.e. at 160° C. for 0.38 second, at 150° C. for 0.43 second, at 143° C. for 0.53 second and at 130° C. for 0.71 second, were applied to the real heat sealer, and heat-sealing was carried out. As a result, good heat-sealing was obtained under respective conditions.

Example 2

Using the same pressing and heating apparatus and the same surface cover material, the time course with the temperature at a heat-sealed part was measured at a temperature of the heating face of 150° C. as to a single layer polyethylene sheet 45 $\mu$m in thickness for vacuum packaging of coffee powder. The results are shown in Table 1.

TABLE 1

| Time (sec) | Heat-Sealed Part Temp. (° C.) | Approx. Primary Differentiation (dT/dt) | Approx. Secondary Differentiation ($d^2T/dt^2$) | |
|---|---|---|---|---|
| . | | | | |
| . | | | | |
| 0.93 | 94.63 | | | |
| 1.03 | 98.25 | 6.74 | | |
| 1.13 | 101.37 | | −1.26 | |
| 1.23 | 104.25 | 5.50 | | ) 0.2 sec/Division |
| 1.33 | 106.87 | | −1.25 | |
| 1.43 | 109.12 | 4.25 | | |
| 4.53 | 111.12 | | −0.37 | |
| 1.63 | 113.25 | 3.88 | | |
| 1.73 | 115.0 | | −0.26 | |
| 1.83 | 116.75 | 3.62 | | |
| 1.93 | 118.62 | | 1.26 | |
| 2.03 | 121.13 | 4.88 | | |
| 2.13 | 123.5 | | −0.38 | |
| 2.23 | 125.87 | 4.50 | | |
| 2.33 | 128.0 | | −0.13 | |
| 2.43 | 130.5 | 4.37 | | |
| 2.53 | 132.37 | | −0.49 | |
| 2.63 | 134.5 | 3.88 | | |
| 2.73 | 136.25 | | −0.38 | |
| 2.83 | 138.12 | 3.50 | | |
| 2.93 | 139.75 | | −0.38 | |
| 3.03 | 141.25 | 3.12 | | |
| 3.13 | 142.87 | | −0.74 | |
| 3.23 | 144.0 | 2.38 | | |
| . | | | | |
| . | | | | |

From the results of the approximate secondary differentiation, the fusing point of the polyethylene sheet was found to be about 118.5° C.

Then, the polyethylene sheet was heat-sealed at 126° C. for 2.3 seconds using the real heat sealer, and good heat-sealing was obtained.

What is claimed is:

1. A method for determining heat-sealing conditions comprising the steps of:
   (1) providing a pressing and heating test apparatus having two faces which face each other, at least one face being movable towards the other face for nipping an object to be heat-sealed, means for heating at least one face and means for measuring the temperature of at least one face;
   (2) providing a surface cover material on a heating face made of the same material as a cover sheet provided on a production heat sealer;
   (3) inserting a minute temperature sensor in the form of a wire having a diameter of from 5 to 50 μm between surfaces of the object that are to be heat sealed;
   (4) positioning the object between the two faces;
   (5) heating the at least one face provided with the heating means to a temperature exceeding the fusing point of the surfaces that are to be heat sealed;
   (6) moving the at least one movable face towards the other face to nip the object;
   (7) measuring a time course of temperature at the surfaces that are to be heat sealed; and
   (8) operating the production heat sealer at a pressing period based on the temperature exceeding the fusing temperature and the measured time course of temperature to produce a heat sealed object.

2. The method of claim 1 which further comprises,
   (9) changing the temperature of the face being provided with a heating means in the step (5) to another temperature also exceeding the fusing point, and conducting the steps (6) and (7), and,
   (10) repeating the above step (8).

3. The method of claim 1 wherein the temperature of the step (5) is in a range from +3° C. to +30° C. higher than the fusing point.

4. The method of claim 1 wherein the pressing period is up to reach the fusing point at the surfaces to be heat-sealed.

5. The method of claim 1 wherein the fusing point is determined by differentiating the time course of temperature.

6. The method of claim 5 wherein the differentiating is carried out twice, and the fusion point is at the position where a difference value turns from minus to plus.

* * * * *